April 22, 1969    J. F. SHERWOOD ET AL    3,439,711
SEQUENTIALLY POWER ACTUATED PLURAL VALVES
Filed July 6, 1966

INVENTORS.
JOHN F. SHERWOOD
MARVIN STASCHKE
BY
Bertha L. MacGregor
ATTORNEY

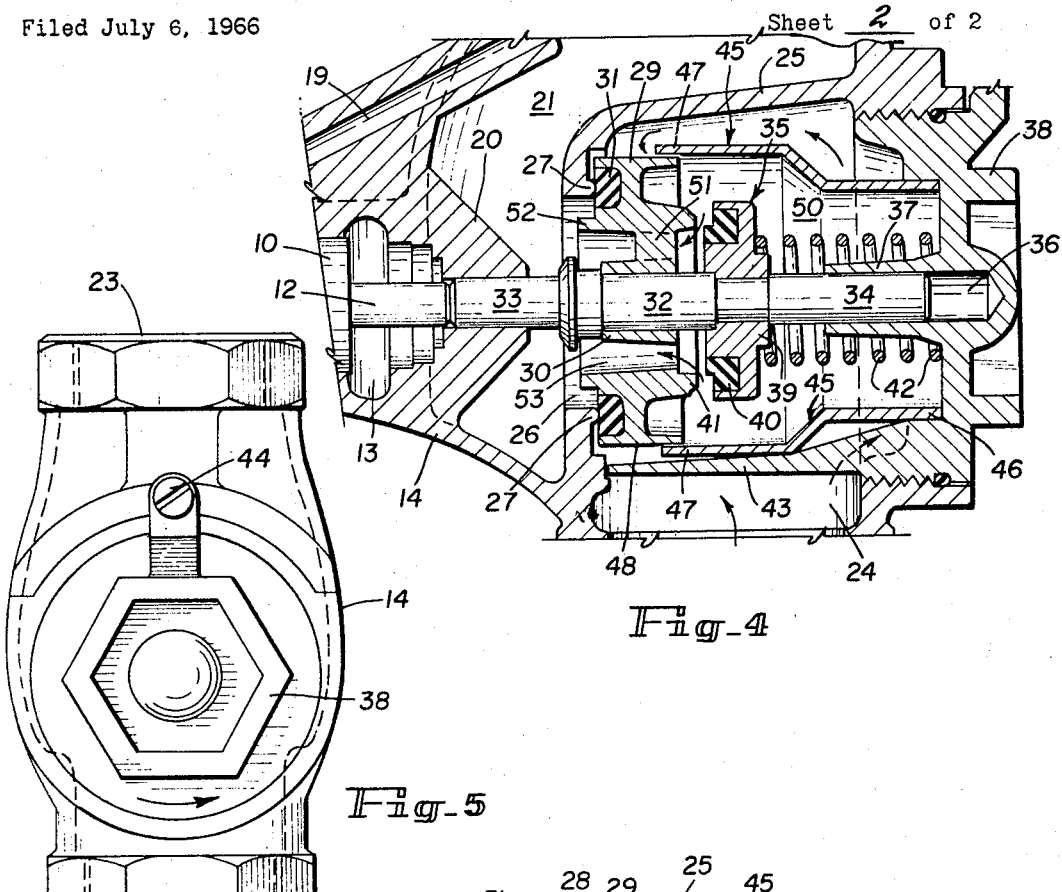

United States Patent Office 3,439,711
Patented Apr. 22, 1969

3,439,711
SEQUENTIALLY POWER ACTUATED PLURAL VALVES
John F. Sherwood, Wheat Ridge, and Marvin Staschke, Thornton, Colo., assignors, by direct and mesne assignments, to Thermal Hydraulics Corporation, Glendora, Calif., a corporation of California
Filed July 6, 1966, Ser. No. 563,181
Int. Cl. F16k *31/00, 39/02*
U.S. Cl. 137—630.15
4 Claims

ABSTRACT OF THE DISCLOSURE

A power actuated valve provided with a fluid intake chamber communicating through a valve opening with a main fluid chamber, and having main and pilot valve members located in the fluid intake chamber. Said valve members have surfaces exposed to incoming water pressure which aids in closing the valve. The fluid intake chamber is provided with means for relieving the main valve member of pressure during the valve opening operation comprising a wall surrounding the valve mechanism in spaced relation thereto forming a pressure-exchange chamber within the fluid intake chamber, the pressure-exchange chamber permitting outflow in greater volume than fluid intake into the pressure-exchange chamber.

---

This invention relates to a power actuated valve, and particularly to a valve construction provided with pressure-relieving means for facilitating the opening of the valve closing members.

Valves embodying our invention are suitable for many purposes, but as shown herein the valve is designed for installation in an automatic irrigation system. In such installations, substantial water pressure is exerted against the valve closing member or members by incoming water, and the valve actuating member must be capable of exerting greater pressure in order to open the valve mechanism for passage of the water through the valve.

The main object of this invention is to provide means in a power actuated valve for temporarily relieving the valve closing means of pressure and thereby facilitating the opening of the valve for free flow of the water therethrough. Without the pressure relieving means of our invention, a larger and higher capacity motor would be required to actuate valve mechanism designed to accommodate a predetermined water flow.

The valve mechanism of our invention has been shown herein as operated by a switchless electrothermal actuator with constant electrical current input suitable for operating valves in automatic irrigation systems. Such an actuator is the subject of the co-pending application for patent of John F. Sherwood and Andrew W. Zmuda, Ser. No. 415,330, filed Dec. 2, 1964 now U.S. Patent No. 3,381,701 dated May 7, 1968. However, the valve may be operated by other suitable power means.

Electrothermal actuators, of which the construction shown in the John F. Sherwood Patent No. 3,029,595 is an example, comprise a high pressure casing, a reciprocally mounted shaft having a piston portion in the casing and a work-contacting portion extending beyond the casing, expansible material in the casing, and electrical means for heating the expansible material including means connecting the electrical means to a source of electrical current. As shown in the said patent, such thermal motors include switch mechanism for interrupting the flow of electrical current when the shaft has moved a predetermined distance into work-contacting position by reason of the expansion of the expansible material in the high pressure casing. Such actuators are employed to actuate dampers, valves, shutters, pumps and other devices. For use in automatic irrigation systems, where it is desirable to hold the thermal motor shaft in its maximum work-contacting position for long periods of time, we prefer to use a switchless thermal motor of the kind described in said co-pending application, Ser. No. 415,330.

We have found that a switchless thermal motor of the kind described herein can be used for efficiently operating valve mechanism of much greater capacity and pressures than the valve mechanism shown in said co-pending application, without increasing the size or capacity of the thermal motor. For example, we are able by use of this invention to actuate a one and one-half inch or a two inch valve with the same thermal motor heretofore required for a one inch valve. This we have achieved by providing the valve mechanism with novel means for relieving the valve closing member of pressure during the valve opening operation.

Another feature of the invention is the provision of means for deflecting or diverting the incoming water flow in such manner that the relieving of pressure on the valve closing member is not hindered or prevented by the incoming flow.

Other objects and advantages of the invention will be apparent from the drawings and following description.

In the drawings:

FIG. 4 is a longitudinal vertical sectional view of a portion of the valve mechanism of FIG. 1, showing the pilot member of the two valve closing members in open position.

FIG. 5 is an elevational end view of the throttle end of the structure.

FIG. 6 is a view similar to FIG. 4, showing the pilot member and the main valve closing member in open positions.

Figure 1:
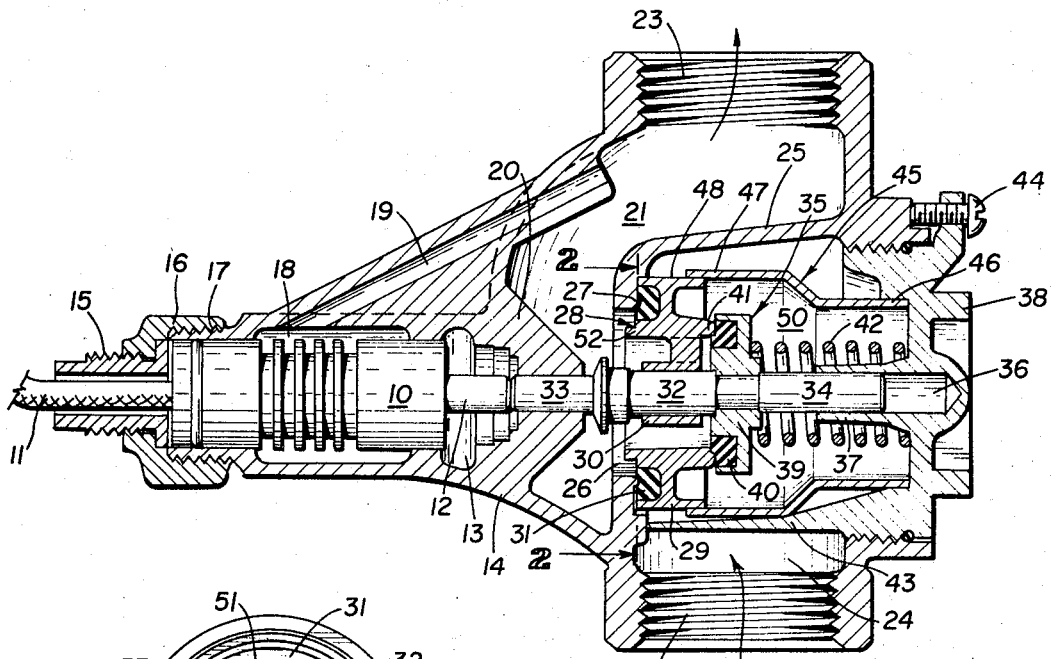
FIG. 1 is a longitudinal vertical sectional view, partly in elevation, of a power actuated two-stage valve mechanism, showing the valve closing members in closed positions.
Figure 2:
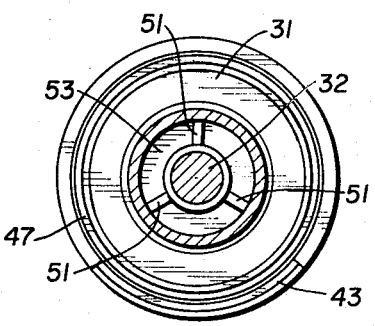
FIG. 2 is a transverse vertical sectional view in the plane of the line 2—2 of FIG. 1.
Figure 3:
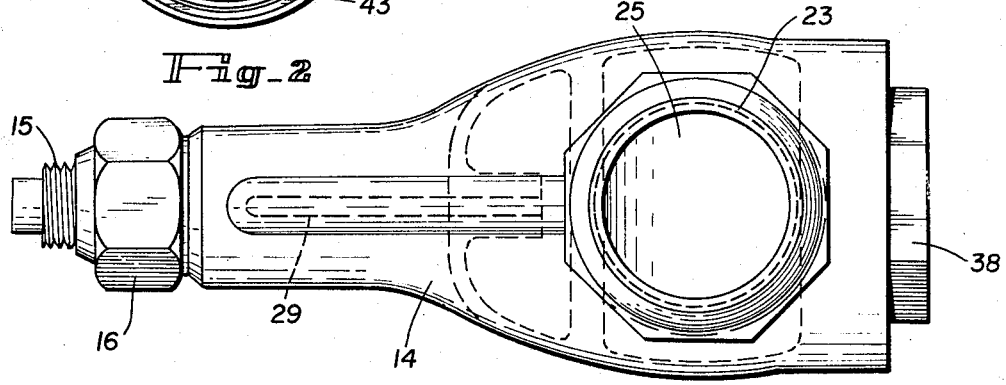
FIG. 3 is a top plan view of the valve.

In that embodiment of the invention shown in the drawings, the valve mechanism is shown as powered by a thermal motor but other actuators provided with a reciprocated shaft may be used. In this embodiment, the stream of water which passes through the device for irrigation or other purposes also serves as the cooling medium for preventing overheating of the actuator.

The actuator illustrated herein comprises a high pressure casing 10, shown as cylindrical in form, but it need not be confined to that particular shape. The casing 10 is hollow to provide a chamber containing expansible material such as wax, for example, which has good expansion properties when subjected to heat. The chamber also contains an electrical heating element and electrodes (not shown), and wires 11 leading to a source of current. The expansible material, when heated, actuates the motor shaft 12 and moves it relatively to the housing 10, outwardly toward the valve mechanism described hereinafter. The exposed end of the shaft 12 is located in the recess 13 formed in the main valve housing 14. An externally threaded nipple 15 adjacent the outer end of the casing 10 is engaged by a threaded nut 16 which also engages the threads 17 on the main housing 14.

An annular space 18 surrounds the thermal motor casing 10, and communicates with the suction passageway or cooling medium by-pass 19 formed in the housing 14. The housing 14 has an enlarged valve enclosing portion located to the right of the annular wall 20, forming a fluid chamber 21 which communicates with the annular space 18. The housing 14 is provided with an internally threaded intake collar 22 and an oppositely located internally threaded outlet collar 23. The intake 22 leads to an intake chamber 24 which is separated from the fluid chamber 21 and outlet 23 by a wall 25. The chamber 24 houses the valve mechanism. The wall 25 has an opening 26 therein, surrounded by the valve seat 27 on which is seated the main valve closing member 28.

The main valve closing member 28 comprises a metallic body 29 integral with a hub 30 and provided with a resilient ring 31 which bears against the seat 27 which surrounds the valve opening 26. The hub 30 is slidably mounted on the stem 32 which projects axially beyond both ends of the hub 30 as indicated at 33 and 34. Also mounted on a reduced diameter portion of the stem 32 is a pilot valve closing member 35 which is fixed on the stem. The stem 32 is movable in axial directions in the bore 36 formed in the sleeve 37 which is part of the rotatable throttle cap 38. The pilot valve member 35 has a metallic body including the hub 39 and resilient ring 40; the latter being adapted to seat on the annular rib 41 formed on the proximate face of the main valve closing member 28 when the two valve closing members are in contacting positions, as will be described in the explanation of the operation of the valve.

A coiled spring 42 surrounds the throttle cap sleeve 37 and stem 32, and bears at one end on the inner surface of the cap 38, and at its other end against the pilot valve body 35. The cap 38 has formed on its inner surface an arcuate vane 43 for controlling the velocity of the fluid flowing into the chamber 24. The position of the vane 43 can be adjusted by turning the cap 38 and tightening the set screw 44 against the wall of the main housing 14. If the cap is turned so that the vane is located directly in the path of the incoming fluid, the velocity and pressure of the fluid is decreased as compared to the condition when the vane is located to one side of the intake 22.

It will be understood that the fluid intake chamber 24 is defined by the annular wall 25, the throttle cap 38, the valve closing members 28 and 35, and the intake 22. Within the intake chamber 24, and surrounding the valve members 28, 35, 32–34, is an annular wall 45 which may be of uniform diameter, but as shown has a smaller diameter end 46 bearing against the inside of the throttle cap 38 inwardly adjacent the velocity controlling vane 43, and a larger diameter end 47 surrounding the peripheral surface 48 of the main valve closing member 28. The inner surface of the end 47 of the annular wall 45 is close to but spaced from the peripheral surface 48 so that the fluid entering the intake chamber can pass slowly between said end portion 47 of wall 45 and the peripheral surface 48 of the main valve closing member 28, and into a pressure exchange chamber 50 within the wall 45 when the valve member 28 is seated on the seat 27 in valve closing position.

The hub 30 of the valve closing member 28 is connected to the body 29 of the member by webs 51 which space the body 29 from the hub and permit fluid to pass from the exchange chamber 50 to the fluid chamber 21. The body 29 is provided with an annular skirt 52 which projects in axial direction from the body 29 to a transverse plane slightly beyond the plane of the body 29, hub 30 and peripheral member 48 of the valve member 28. The skirt 52 prevents inflowing water from interfering with or hindering the outflow of water through the spaces 53 between webs 51 from exchange chamber 50 to fluid chamber 21.

The operation of the valve is as follows: In FIG. 1, the valve closing members 28 and 35 are in the closing positions, the thermal motor shaft 12 is retracted, and the coiled spring 42 is holding the parts in the closed valve positions. When the thermal motor is energized by current passed to the heating element in the expansion chamber in the motor casing 10, expansion of the wax or other material in the casing causes the motor shaft 12 to move outwardly and to impart motion to the valve stem 32 by contact with the portion 33. This motion of the stem 32 moves the pilot valve member 35 into the open position shown in FIG. 4. Meanwhile, water under pressure has entered the fluid intake chamber 24 through intake 22 and has built up valve closing pressure against the surfaces of the valve members 28 and 35 within the chamber 24. The thermal motor is capable of forcing the small pilot valve closing member 35 to the open position of FIG. 4, but if the motor is limited as to size, it does not have sufficient power to move the larger main valve closing member 28 against the pressure in the chamber 24.

However, due to the presence of the annular wall 45 which defines the pressure exchange chamber 50 within the fluid intake chamber 24, the opening of the pilot valve member 35 permits the passage of water out of the chamber 50 through openings 53 between webs 51 at a faster rate than water can pass into the chamber 50 from the intake 22 due to the restricted space between the surface 48 of member 28 and the chamber wall 45. Thus the main valve closing member 28 is relieved of high pressure, and the thermal motor shaft 12 in contact with part 33 of valve stem 32 easily moves the member 28 into the position shown in FIG. 6. In that position of the closing members, the water entering intake 22 passes into the chamber 24 and out through the main opening 26 in wall 25 into the fluid chamber 21 to outlet 23. The water pressure on the side of the valve closing member 28 facing the fluid chamber 21 is greater than the pressure within the pressure exchange chamber 50, and therefore the load on the thermal motor shaft 12 is very light, being equal only to that exerted by the spring 42, without pressure derived from the incoming water flow which otherwise would be exerted against the opposite side of the member 28 if the wall 45 were not provided to enclose the valve parts in a pressure exchange chamber 50.

In order to prevent interference with the free flow of water through the openings 53 out of the pressure exchange chamber 50, when the valve closing member 28 is moving from the position of FIG. 4 to that of FIG. 6, the skirt 52 has been provided on the member 28 to serve as a deflector for the water entering the chamber 24 through intake 22. As shown in FIG. 6, the skirt 52 guides the incoming flow away from the outlets of the openings 53 and thus the incoming flow does not hinder or prevent passage of water out of the chamber 50 while the closing member 28 is moving from the FIG. 4 to the FIG. 6 positions.

Without the provision of the pressure exchange chamber 50, a motor, thermal or other, of much greater size and power capacity than that shown would have to be used in order to open the closing member 28 against the water pressure in the intake chamber 24.

In describing the invention, reference has been made to a particular example embodying the same, but we wish it to be understood that the invention is not limited to the construction shown in the drawing and that various changes may be made in the construction and general arrangement of parts without departing from the invention as defined by the appended claims. The most obvious change is that heretofore mentioned, that any motor provided with means for imparting reciprocating motion to the shaft which actuates the valve closing members, may be substituted for the thermal motor shown herein.

We claim:
1. A power operated valve comprising
 (a) a motor having a reciprocable shaft provided with a work contacting end,
 (b) a valve housing having fluid intake and outlet openings enclosing the motor shaft and providing a main fluid chamber,
 (c) a wall in the housing defining a fluid intake chamber having a valve opening therein in axial alignment with the motor shaft and communicating with the main fluid chamber,

(d) valve mechanism comprising a main valve member and a pilot valve member closing said valve opening, said main and pilot valve members being located within the fluid intake chamber and having surfaces exposed to incoming water pressure and adapted to be moved by said shaft to open position to permit fluid to pass through said valve opening from the fluid intake chamber to the main fluid chamber, and (e) means for relieving the main valve member of pressure during the valve opening operation comprising a wall surrounding the valve mechanism in spaced relation thereto forming a pressure-exchange chamber within the fluid intake chamber, (e–1) said pressure-exchange chamber having fluid intake means and fluid outlet means, said outlet means permitting outflow of fluid from the pressure-exchange chamber through the valve opening in greater volume than the fluid intake into said pressure-exchange chamber, whereby the main valve member of the valve closing mechanism is relieved of valve-closing pressure when the pilot valve member is moved to open position.

2. The valve defined by claim 1, in which the main valve member is provided with a central opening, and the pilot valve member seats on the main valve member to close said opening, said main valve member being provided with a concentric skirt which surrounds the central opening and extends into the path of fluid flow from the fluid intake chamber to the main fluid chamber through the valve opening in the fluid intake chamber to prevent said fluid flow from hindering the outflow of fluid from the pressure-exchange chamber when the valve members are moved to open position.

3. The valve defined by claim 1, in which the pressure-exchange chamber fluid intake means is a restricted annular space between the pressure-exchange chamber wall and the peripheral surface of the main valve member, and the pressure-exchange chamber fluid outlet means is an opening in the main valve member which communicates with the valve opening between the intake fluid chamber and the main fluid chamber.

4. A power operated valve comprising (a) a motor having a reciprocated shaft mounted in a casing having a work contacting end extending beyond the casing, (b) a valve housing having fluid intake and outlet openings enclosing the motor casing and shaft and providing a main fluid chamber between said openings, (c) a wall in the housing defining a fluid intake chamber having a valve opening therein surrounded by a valve seat in axial alignment with the motor shaft and communicating with the main fluid chamber, (d) valve mechanism comprising a main valve and a pilot valve member closing said valve opening, said main and pilot valve members being located within the fluid intake chamber and having surfaces exposed to incoming water pressure and adapted to be moved by said shaft to open position to permit fluid to pass through said valve opening from the fluid intake chamber to the main fluid chamber, and (d–1) said main valve member having a concentric metallic body provided with a central opening and having a hub connected by web to the concentric body, and a resilient ring embedded in the metallic body adapted to seat on the valve seat surrounding the opening in the fluid intake chamber, (d–2) said pilot valve member having a concentric metallic body and a resilient ring embedded therein for seating on the main valve member to close the central opening therein, and (e) means for relieving the main valve member of pressure during the valve opening operation comprising a wall surrounding the valve mechanism in spaced relation thereto forming a pressure-exchange chamber within the fluid intake chamber, (e–1) said pressure-exchange chamber having fluid intake means and fluid outlet means, said outlet means permitting outflow of fluid from the pressure-exchange chamber through the valve opening in greater volume than the fluid intake into said pressure-exchange chamber, whereby the main valve member of the valve closing mechanism is relieved of valve-closing pressure when the pilot valve member is moved to open position.

References Cited

UNITED STATES PATENTS

| | | | |
|---|---|---|---|
| 2,055,133 | 9/1936 | Newell | 137—629 X |
| 2,213,488 | 9/1940 | Dowrick | 137—630.15 |
| 2,259,809 | 10/1941 | Freeman | 137—630.15 X |
| 2,265,496 | 12/1941 | Shaw | 137—630.15 X |
| 2,966,167 | 12/1960 | Jensen | 137—630.15 X |
| 3,213,887 | 10/1965 | Angelery | 137—630.15 |

CLARENCE R. GORDON, *Primary Examiner.*

U.S. Cl. X.R.

137—630.19; 251—11